United States Patent
Di Donna et al.

(10) Patent No.: US 9,428,344 B2
(45) Date of Patent: Aug. 30, 2016

(54) METHOD AND APPARATUS FOR REALIZING A CONTINUOUS AND ORDERED FLOW OF CONTAINERS

(71) Applicant: Fameccanica.Data S.p.A., Pescara (IT)

(72) Inventors: Mario Di Donna, Sambuceto di San Giovanni Teatino (IT); Enrico Goffredo, Pescara (IT); Enio Giovanni Cianci, Sambuceto di San Giovanni Teatino (IT); Enrico Fratangelo, Francavilla al Mare (IT); Oronzo Lucia, Pescara (IT)

(73) Assignee: FAMECCANICA.DATA S.P.A., Pescara (IT)

( * ) Notice: Subject to any disclaimer, the term of this patent is extended or adjusted under 35 U.S.C. 154(b) by 0 days.

(21) Appl. No.: 14/434,253
(22) PCT Filed: Oct. 21, 2013
(86) PCT No.: PCT/IB2013/059495
§ 371 (c)(1),
(2) Date: Apr. 8, 2015
(87) PCT Pub. No.: WO2014/064593
PCT Pub. Date: May 1, 2014

(65) Prior Publication Data
US 2015/0274436 A1  Oct. 1, 2015

(30) Foreign Application Priority Data
Oct. 23, 2012 (IT) ............... TO2012A0931

(51) Int. Cl.
  B65G 47/14  (2006.01)
  B65G 47/24  (2006.01)
(Continued)

(52) U.S. Cl.
CPC ............ *B65G 47/14* (2013.01); *B25J 9/0093* (2013.01); *B65B 43/46* (2013.01); *B65B 57/04* (2013.01);
(Continued)

(58) Field of Classification Search
CPC .... B65G 47/24; B65G 47/14; B65G 47/248; B65G 2201/0244; B65G 2203/0225; B65G 2811/0626
USPC ................. 198/382, 394, 395, 401
See application file for complete search history.

(56) References Cited

U.S. PATENT DOCUMENTS 4,530,430 A * 7/1985 Peterlini ............. B65G 47/244
                                                                  198/395
4,825,995 A * 5/1989 Nalbach ............. B65G 47/1457
                                                                  198/380
(Continued)

FOREIGN PATENT DOCUMENTS

EP   0 374 107 A1   6/1990
EP   0 613 841 A1   9/1994
(Continued)

OTHER PUBLICATIONS

Abstract for JP H06 305551 A (2 pages).
(Continued)

*Primary Examiner* — Douglas Hess
(74) *Attorney, Agent, or Firm* — Popovich, Wiles & O'Connell, P.A.

(57) ABSTRACT

Method and apparatus for realizing a continuous and ordered flow (50) of containers (20), comprising the steps of:— providing a feed flow (30, 30') of containers (20) arranged with the respective main axes (X-X) randomly oriented; detecting for each container (20) the position and the orientation of its main axis (X-X), and which of the two main faces (A, B) of the container lies on the transport surface (14, 14'); picking up (12, 12') said containers (20) from said transport surface (14, 14') and releasing said containers (20) in a first continuous and ordered output flow (40) in an advancing direction (MD), on a surface (18) of a first output transport system (15), wherein said containers are aligned, equidistant (P) from one another, with the respective main axes (X-X) parallel to each other and perpendicular to said advancing direction (MD), picking up (62) said containers (20) from said first continuous and ordered output flow (40), rotating the main axis X-X of each container (20) by 90° in a first direction, the containers which have a first main face (A) lying on the surface (18) of the first output transport system (15), and rotating in a second direction, opposite to the first direction, the containers that have a second main face (B) lying on the surface (18) of the output first transport system (15), and depositing (62) said containers (20) on a second output transport system (70), realizing a second continuous and ordered flow (50) in an advancing direction (MD") wherein said containers (20) are aligned, equidistant from each other and with the respective longitudinal axes (X-X) perpendicular to the surface (72) of said second output transport system (70), with the filling openings (22) facing upwards and with the respective main faces (A, B) all oriented in the same direction.

14 Claims, 4 Drawing Sheets

(51) Int. Cl.
| | |
|---|---|
| *B25J 9/00* | (2006.01) |
| *B65B 43/46* | (2006.01) |
| *B65B 57/04* | (2006.01) |
| *B65G 47/244* | (2006.01) |
| *B65G 47/28* | (2006.01) |
| *B65G 47/64* | (2006.01) |
| *B65B 3/00* | (2006.01) |

(52) U.S. Cl.
CPC ............. *B65G 47/24* (2013.01); *B65G 47/244* (2013.01); *B65G 47/28* (2013.01); *B65G 47/64* (2013.01); *B65B 3/00* (2013.01); *B65G 2201/0244* (2013.01); *B65G 2203/0225* (2013.01); *B65G 2811/0626* (2013.01); *B65G 2811/0673* (2013.01)

(56) References Cited

U.S. PATENT DOCUMENTS

| | | | | |
|---|---|---|---|---|
| 4,928,808 | A * | 5/1990 | Marti | B65G 47/1471 198/397.06 |
| 5,165,219 | A * | 11/1992 | Sekiguchi | B65B 35/58 53/142 |
| 5,370,216 | A * | 12/1994 | Tsuruyama | B25J 9/1697 198/376 |
| 5,769,203 | A * | 6/1998 | Marti Sala | B65G 17/32 198/397.01 |
| 6,315,103 | B1 * | 11/2001 | Boucherie | A46D 3/085 198/395 |
| 6,502,688 | B1 * | 1/2003 | Krooss | B65G 47/252 198/395 |
| 6,520,317 | B2 * | 2/2003 | Sherwin | B65G 47/52 198/436 |
| 6,648,123 | B1 * | 11/2003 | Rustad | B65G 47/24 193/47 |
| 6,711,880 | B2 * | 3/2004 | Wipf | B65B 9/06 53/203 |
| 6,779,647 | B1 * | 8/2004 | Nagler | A22C 17/0093 198/395 |
| 8,376,119 | B2 * | 2/2013 | Yohe | B29C 49/4273 198/395 |
| 8,489,226 | B2 * | 7/2013 | Lourman | B41F 15/0872 414/730 |
| 8,880,216 | B2 * | 11/2014 | Izumi | B25J 9/1697 198/395 |
| 8,905,222 | B2 * | 12/2014 | Worz | B65G 47/268 198/440 |
| 9,272,421 | B2 * | 3/2016 | Subotincic | B25J 9/0093 |
| 9,289,897 | B2 * | 3/2016 | Mattern | B25J 9/1612 |

FOREIGN PATENT DOCUMENTS

| | | |
|---|---|---|
| JP | H06 305551 A | 11/1994 |
| JP | H08 2654 A | 1/1996 |
| JP | 2006 256744 A | 9/2006 |

OTHER PUBLICATIONS

Abstract for JP H08 2654 A (2 pages).
Abstract for JP 2006 256744 A (2 pages).

* cited by examiner

METHOD AND APPARATUS FOR REALIZING A CONTINUOUS AND ORDERED FLOW OF CONTAINERS

FIELD OF THE INVENTION

The present invention relates to a method capable of realizing a continuous and ordered flow of containers.

The invention has been developed particularly for organizing plastic containers of any shape, intended to be filled with viscous liquids, such as cleaning agents, detergents, cosmetics, food substances, etc.

The invention can, however, be applied, in general, to any field wherein a continuous flow of containers is supplied to the successive labeling, and/or filling and/or closing stations.

DESCRIPTION OF THE PRIOR ART

The automatic machines suitable for labeling and/or filling, and/or closing containers that present an opening for filling, such as bottles, flasks and the like, need a continuous and ordered flow of said containers, specifically they must be placed at a constant pitch from each other, i.e. they must be equidistant from each other, and they must all have the filling opening facing in the same direction.

However, in many cases this is not sufficient as the shape of the containers complicates said labeling, filling and closing (capping) operations, and can be far more sophisticated and complex than the traditional cylindrical shape, with the neck portion aligned with the central main axis of the body. In fact, in many cases these pieces of machinery are required to process containers with particular morphological features, such as, for example, a flattened shape, sides with different profiles and/or the neck portion arranged in an irregular way, and thus—in order to automatically proceed to the labeling, filling, closing (capping), or boxing operations—it is necessary to previously order the containers into a flow of containers that are all in the same position (for example with the part of the neck facing upwards) and with the same orientation (for example with each of the larger faces arranged on a predetermined side with respect to the advancing direction).

The solutions capable of generating a continuous and ordered flow of containers with a complex shape, starting from a random and discontinuous feed system, able to feed the subsequent labeling, and/or filling, and/or closing machines, are generally complex and expensive, since they are composed of a series of pieces of equipment placed in a cascade arrangement and in phase with the accumulation systems of containers interposed between each piece of apparatus. Specifically, the containers are randomly loaded, with bags or baskets into a first machine known as the sorting bowl comprising a cup-shaped rotary hopper, wherein the containers, randomly loaded in the center of the hopper, accumulate together and gradually go back up along the periphery wall, and output from the edge of the cup mouth in a series of selection trays appended to one another. A structure of this type is described, for example, in EP-A-0 374 107.

Each of the selection trays is provided with detection means, which identify the orientation of the container which has been received within it, and an unloading system, which can be activated on both the longitudinal ends of the tray according to the orientation of the container that has been acquired from the detecting means, so as to eject the containers with the filling openings facing upwards.

Each container, which is slid from the selection trays, is inserted into the corresponding compartment of a first star wheel located downstream of each tray of the sorting bowl. The first star wheel is an output wheel, which serves precisely to take out the vertically placed containers from the sorting bowl.

Then, by means of a subsequent transfer star wheel, the containers are carried on an additional orientation wheel on which a series of motorized spindles is provided on its periphery, able to axially rotate each container and to release them all with the same orientation, or rather with all the containers in a vertical position and with all the corresponding faces facing in the same direction.

To the skilled person, it is evident that the output flow of containers from the sorting bowl can be non-continuous as there may be moments wherein no container is being oriented. The above results in a discontinuous feed flow of containers. To eliminate this discontinuity, it is necessary to add accumulation conveyors at the output of the sorting bowl.

The known solutions, such as the one just described, are affected by several drawbacks. Firstly, the complexity and poor reliability of the sorting bowl. In addition, the conveyors that allow the accumulation of the containers between the various pieces of apparatus responsible for ordering the flow of containers occupy a lot of space. Indeed, in the prior art, the system that generates a continuous and ordered flow of containers, generally envisages a series of machines that are independent from each other, each equipped with its own independent accumulation system.

As already said, it should be added that said organizing systems are heavily influenced by the shape and dimensions of the containers, requiring significant changes to the individual machines when it becomes necessary to change the shape of the container that requires processing.

To the skilled person, it is also evident that the sorting bowl types of apparatus are subject to frequent jamming, especially in the unloading trays, which affect the efficiency of the whole production line.

As a consequence of what has previously been stated, the overall cost of the apparatus is high, its efficiency is conditioned by the correct operation of the sorting bowl, and a long and problematic setup is required, to be carried out at the establishment of the user of the machinery, in non-optimal conditions for the testing activities, and an arduous setup for coordinating the speeds of the various machines with each other, and of the intermediate conveyors for each container format.

OBJECT AND SUMMARY OF THE INVENTION

The present invention aims to provide a device and a method that overcome the problems of the prior art and that are capable of providing, at the output, a continuous and ordered flow of vertically-placed containers of any shape, that are equidistant between each other, to a subsequent piece of apparatus, in turn, capable of carrying out at least one of the operations of labeling, filling and closing of the containers.

According to the present invention, this object is achieved by a method and the relative apparatus, which have the features forming the subject of the claims.

The claims form an integral part of the disclosure provided in relation to the invention.

BRIEF DESCRIPTION OF THE DRAWINGS

The present invention will now be described in detail with reference to the accompanying drawings, provided purely by way of non-limiting example, wherein.

DESCRIPTION OF PREFERRED EMBODIMENTS

In the following description, various specific details are illustrated aimed at providing a thorough understanding of the embodiments. The embodiments can be, implemented without one or more of the specific details, or with other methods, components, materials etc. In other cases, known structures, materials, or operations are not shown or described in detail to avoid obscuring the various aspects of the embodiments.

The reference to "an embodiment" in the context of this description indicates that a particular configuration, structure or feature, described in relation to the embodiment, is comprised in at least one embodiment. Therefore, phrases such as "in an embodiment", possibly present in different places of this description do not necessarily refer to the same embodiment. Furthermore, particular conformations, structures, or features can be combined in any suitable manner in one or more embodiments.

The references used herein are for convenience only and therefore do not define the field of protection or the scope of the embodiments.

Figure 1:
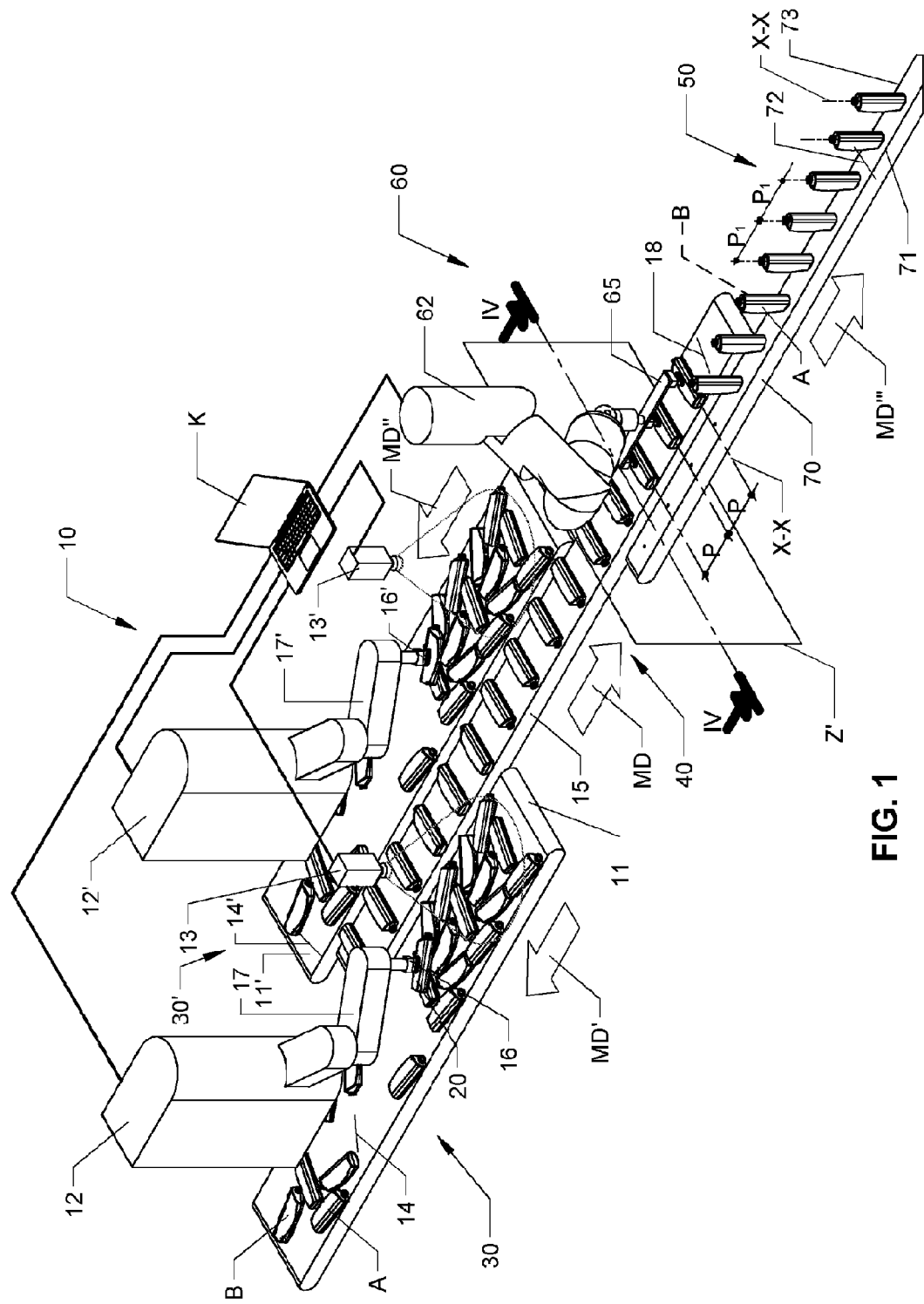
FIG. 1 is a schematic perspective view of a preferred embodiment of the present invention.

FIG. 1 illustrates the structure of a device 10 for the organizing of containers 20 represented, in the example considered here, by bottles or flasks of a flattened and irregular form. To fix ideas, but without interpreting this in a limitative sense of the embodiments, these can be bottles or flasks 20 of plastic material coming from a feed system with bags or baskets which deposits the containers randomly on a feed transport system 11, 11' capable of generating a feed flow 30, 30' of containers 20 that travels in the feed direction MD', MD".

In the preferred embodiment, as is clearly shown in FIG. 1, the feed system is constituted by at least two feed transport systems 11, 11', which have been schematically represented as conveyor belts, so as to form two parallel flows 30 and 30' of containers 20. In general, all the transport systems 11, 11', 15 and 70 of the device 10 are schematically represented as conveyor belts and mentioned as such. The constructive features of conveyors 11, 11' are well known in the field and do not require a more thorough description.

Figure 2:
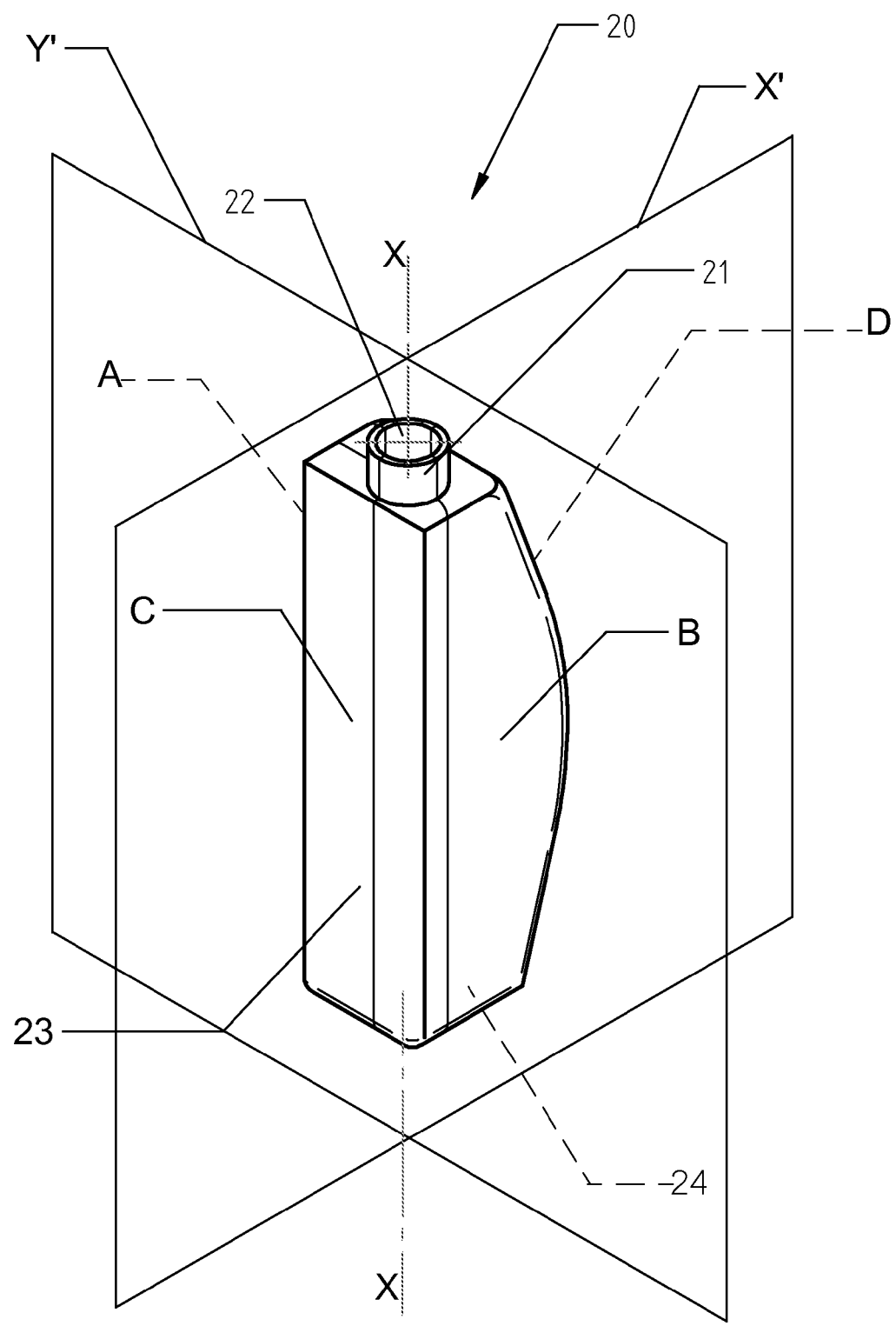
FIG. 2 is a perspective view of an asymmetrical container that can be processed in a piece of equipment according to the present invention.

The containers 20 can be, for example, molded and/or blown plastic bottles or flasks intended for containing shampoo, liquid soap, detergents, or other products for cleaning and hygiene, or even food substances Hereinafter it will be assumed, by way of example, that the containers 20, as represented in FIG. 2 can present an overall flattened shape with a part of the neck or mouth 21 (intended to receive a closing cap) placed in an irregular position relative to the body 23 of the container. Each container 20 is provided with a filling opening 22, which can normally be circular, with a main (or longitudinal) axis X-X, generally aligned with the largest dimension of the container 20, which can be, typically, orthogonal to said filling opening 22 and passing through its center. In addition, each container 20 can present a bottom surface 24, which in turn, typically, can also be perpendicular to said axis X-X.

Containers of this type, with an irregular shape, such as that illustrated in FIG. 2, are commonly known as asymmetric.

It is also possible to use the following method to determine when a container is asymmetric: once the main axis X-X of a container 20 is defined, the container can be said to be asymmetric if it is possible to identify, in the collection of planes passing through the main axis X-X, at most a single plane of symmetry, namely a plane that identifies a symmetry in the container 20 concerned.

In the specific case of the asymmetric container of FIG. 2, to be precise, it is possible to identify just a single plane of symmetry X' in the collection of planes passing through the axis X-X, which defines a first side face A and a second side face B situated at the sides of said plane of symmetry X' that connect said filling opening 22 to said bottom surface 24, said faces also being called larger or main surfaces. The two symmetrical surfaces (or larger, or main) A and B are connected together by two connection (or side) surfaces (or faces) C and D which, in turn, are not symmetrical with respect to the plane Y' passing through the main axis X-X and perpendicular to the plane of symmetry X' because they present different shapes from each other, or because they are situated at different distances with respect to aforesaid plane Y', or because both conditions occur, as clearly represented in FIG. 2.

In practice, the containers can present very complex and irregular shapes, fruit of the designers' inspiration. In cases of this kind, it is possible that no main axis X-X orthogonal to the filling opening 22 can be identified, as for example in the case of bottles with oblique and variously shaped necks.

For containers of this shape the main axis X-X can be made to coincide with any straight line passing through the inside of the container and parallel to its largest size.

It is also possible to find containers wherein one or both surfaces C and D are practically absent, i.e., reduced only to a simple connecting element between the two main surfaces A and B; it is obvious that said connecting elements must be interpreted in the same way as surfaces.

In general, the main surfaces A and B and the side surfaces C and D, when present, or more generally the corresponding connecting elements, are essentially aligned with the main axis X-X, though not necessarily parallel to it, as shown for example in the container 20 illustrated in FIG. 2.

Similarly, it is possible to find containers wherein the bottom surface 24 is absent and in this case, as well, said surface can be reduced to a simple connection between the two main surfaces A and B.

In the preferred embodiment shown schematically in FIG. 1, the containers 20, that can be of any shape and also, therefore, asymmetric, as illustrated, are randomly fed onto feed transport systems 11, 11' with the respective main axes X-X randomly oriented and they lie with one of the larger faces A or B on the surface 14, 14' of the respective feed transport system 11, 11'.

The apparatus 10 is provided with control means 13, 13' which are able to detect, for each container, its position on the surface 14, 14' of the respective feed transport system 11, 11', the orientation of the main axis X-X and the position of the filling opening 22 and which of the two main faces of A or B is lying on the surface 14, 14' of the feed transport system 11, 11', by deriving said information from the determination of the location of said side surfaces C and D with respect to the position of the filling opening 22 (or the neck 21) of each container 20 concerned.

Suitable control means can be vision systems of the type IS7402-11 In-Sight 7402, 1280×1024 30 fps provided with objectives M118FM16 Megapixel, 16 mm f/1.4 produced and marketed by Univision S.r.l—Via Appiani, s.n.c.—20831 Seregno (MB)

The information acquired by the control means 13, 13' on each container 20 are processed by a processor K capable of controlling a gripping means 12, 12' which, in a preferred embodiment, can be an industrial robot of the type known as "fast picker" particularly suited to handling elements weighing less than 1 kg, and of reduced dimensions, capable of picking up containers 20, previously analyzed by control means 13, 13' and the processor K, from the feed transport system 11, 11' and to deposit them in order on the surface 18 of the first output transport system 15 one behind the other, generating a continuous and ordered flow 40 of containers 20 wherein each of said containers is lying on said surface 19 of the first output transport system 15, on one of the two main faces A or B, i.e. in the position that can be typically horizontal, with the respective connecting sides C and D all facing in the same direction, equidistant from one another, or spaced between each other by a constant pitch P along the output direction MD, with the main axes X-X parallel to each other and perpendicular to the advancing direction MD of the first continuous and ordered output flow of containers 20.

Figure 3:
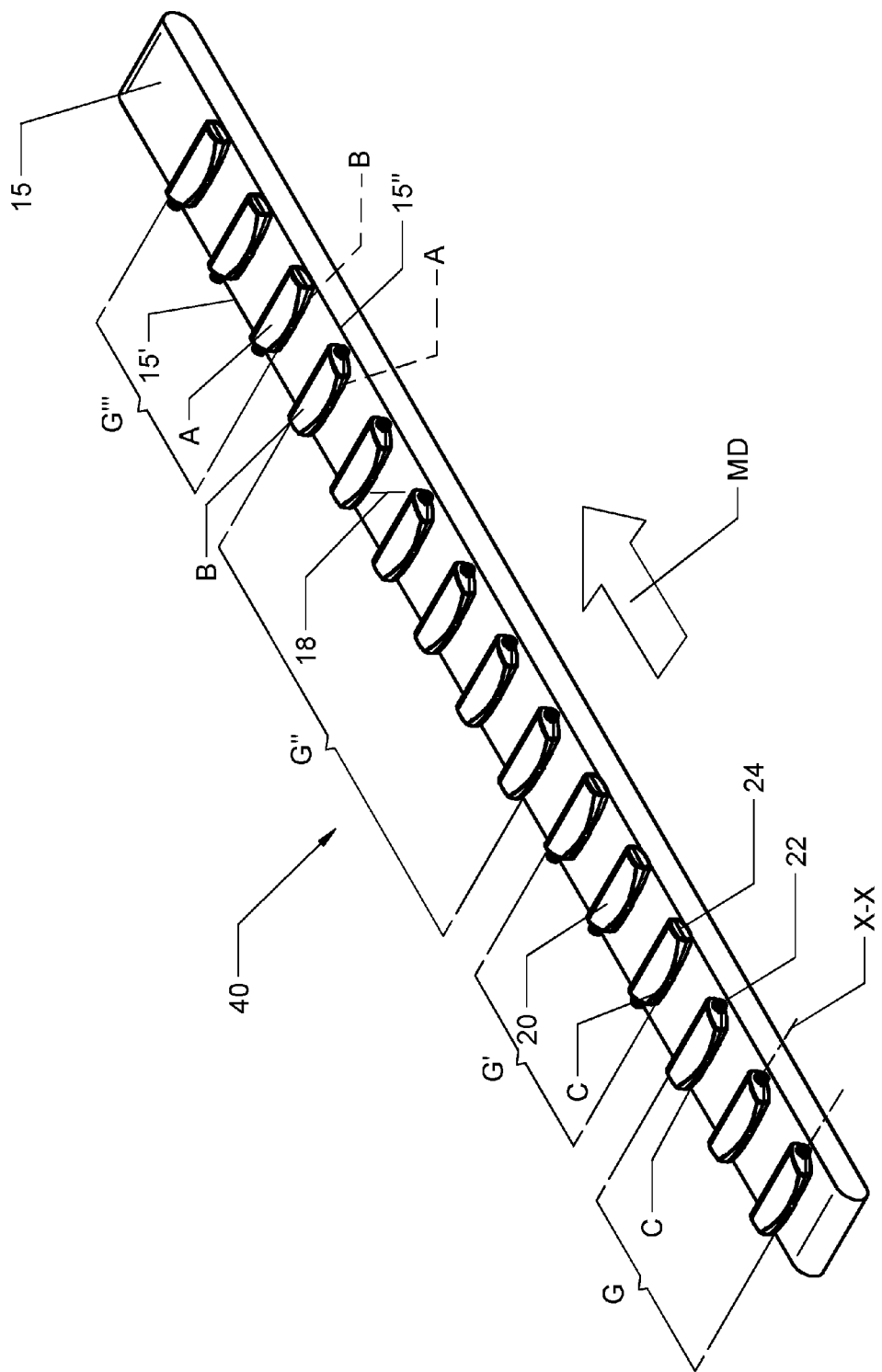
FIG. 3 is a schematic perspective view that highlights the features of the first continuous and ordered flow of containers.

It is evident that in a first continuous and ordered output flow 40 of containers 20, which may be asymmetric, such as the one just described and illustrated in the figures, in particular in FIG. 2, the containers 20 that have the surface A in contact with the surface 18 of the first output transport system 15 have the filling opening 22 of the container 20 facing in one direction, while the containers which have the surface B in the contact surface 18 of said first output transport system 15 have the filling opening 22 of the container 20 facing in the opposite direction. Referring to FIG. 3 and indicating with 15' and 15" the edges of the first output transport system 15, in the first case, or rather container 20 with the surface A in contact with the surface 18 of the first output transport system 15, the filling opening 22 is directed towards the edge 15', while in the other case, i.e. when the surface B is in contact with said surface 18 of the first output transport system 15, the filling opening 22 is directed toward the edge 15".

In this preferred configuration, a first continuous and ordered flow 40 of containers 20, particularly advantageous for subsequent handling operations to which the individual containers 20 must be subjected, is that wherein said containers 20 are collected in consecutive groups G, G', G", G"', . . . of containers 20. In each of the aforesaid groups G, G', G", G"', . . . of containers 20, the filling openings 22 are all facing in the same direction, in addition, two groups of consecutive containers have the filling openings 22 facing in opposite directions.

Each group G, G', G", G"', . . . consists of at least a minimum number N of containers 20 or by one of its integer multiples (1, 2, 3, . . . , ).

The minimum number N of containers which can contribute to forming a group G, G', G", G"', . . . is between 2 and 50 and preferably between 3 and 10.

The minimum number N represents the minimum population that a group G, G', G", G"', . . . can have, as clearly shown in FIG. 3, the groups G, G' e G"' are composed precisely of the minimum number N of containers 20, which in the case exemplified in the Figure is 3, while the group G" is composed of 6 containers, or rather double the minimum number N which in this case is 3. Still referring to the group G" represented in FIG. 3, it is evident that the filling openings 22 of the six containers belonging to it are facing towards the edge 15' of the first output conveyor belt 15, while the filling openings of the groups G' and G"', which respectively precede and follow the group G", are facing towards the edge 15" of said first output transport system 15.

The first output transport system 15 has also been schematically represented as a conveyor belt, as clearly indicated in FIGS. 1 and 3. The constructive features of the conveyors to be used in the required application for the first output transport system 15, in the preferred embodiment described, are well known in the field and they do not require a detailed description.

In a preferred embodiment, the processor K can be constituted by a group of control elements centered on a PLC (Programmable Logic Control) Siemens S400. The processor K can contain accessory elements for current use intended to enable the correct interfacing between the control means 13, 13' and the gripping means 12, 12'. Among these elements, for example, a Cognex distribution block for I/O PLC-vision system exchange can be mentioned.

In the preferred embodiment illustrated in FIG. 1, the directions MD' and MD" of the feed flows 30 and 30' of the containers 20 and the direction MD of the ordered output flow 40 can typically be parallel to each other; while the directions of the two feed flows 30, 30' and the continuous and ordered output flow 40 may be the same or different from each another. In the embodiment of FIG. 1, they are different.

In the preferred embodiment, a gripping means 12, 12' particularly suitable for this type of apparatus, illustrated in FIG. 1 is the "fast picker" model TP80 Industrial Robot produced and marketed by Stäubli International AG—PO Box 30—CH-8808 Pfäffikon/Switzerland.

The gripping means 12, 12' is usually provided with a gripper 16, 16' at the end of its arm 17, 17' in turn equipped with a coupling system, typically of the vacuum type. For example the gripper 16, 16' can be fitted with a piece of apparatus for the generation of a vacuum of the type VGS3010.AB.01.BA and of a suction cap OB20× 60P5E.G31M cpl both produced and marketed by Piab Italy S.r.l—Via Cuniberti, 58—10151 Torino—Italy.

It is evident to the skilled person that the processor K can be advantageously integrated into the control electronics of the gripping means 12, 12'.

In the preferred embodiment, as clearly illustrated in FIG. 1, downstream of the first output transport system 15, an additional handling station 60, can be advantageously installed, which is fed from said first output transport system 15 and is responsible for realizing a second continuous and ordered output flow 50 of containers 20 arranged with the main axis X-X vertical and perpendicular to the surface 72 of the second output transport system 70, equidistant from each other at a pitch $P_1$ and, in the case of containers with an asymmetric shape, with the main surfaces A and B and, consequently, the connecting surfaces C and D all facing in the same direction.

The second output transport system 70 has also been schematically represented as a conveyor belt, as clearly shown in FIGS. 1 and 3. The constructive features of the conveyors to be used in the required application for the second output transport system 70 in the preferred embodiment described, are well known in the field and they do not require a detailed description.

Therefore, in the aforesaid preferred embodiment illustrated in FIG. 1, a first continuous and ordered output flow 40 of containers 20, which can be asymmetrical in shape, deposited on the surface 18 of the first output transport system 15, feeds the handling station 60. The first continuous and ordered output flow 40 in the preferred embodiment is composed of a sequence of groups G, G', G'', G''', ... of containers 20, wherein each container 20 has one of the two main faces A or B lying on the surface 18 of the first output transport system 15 and, in the case that the containers 20 are asymmetric, with the respective connecting surfaces C and D all facing in the same directions, equidistant from each other, or rather spaced between each other by a constant pitch P along the output direction MD, with the main axes X-X parallel to each other and perpendicular to the advancing direction MD of the first continuous and ordered output flow 40 of the containers 20 and wherein each group G, G', G'', G''', ... of the containers 20 is composed of at least a minimum number N of containers or by one of its integer multiples, wherein N is between 2 and 50 and preferably between 3 and 10 and wherein each of aforesaid groups of containers G, G', G'', G''', ... has the filling openings 22 all facing the same direction. In other words, each group of containers presents the same main surface A or B in contact with the surface 18 of the first output transport system 15. In addition, two groups of consecutive containers (G-G', G'-G'', etc.) have the filling openings 22 facing in opposite directions.

The apparatus 60 can be provided with second control means (not shown in FIG. 1) which are able to detect the position of each group of containers G, G', G'', G''', .... Said second control means may be able to detect, for each group G, G', G'', G''', ... of containers 20, which composes the first continuous and ordered output flow 40, the direction in which the filling openings 22 of the containers of the group concerned are facing, or rather it recognizes which of the two main faces A or B is lying on the surface 18 of the first output transport system 15.

The information acquired by the second control means on each of the groups G, G', G'', G''', ... of containers 20 can be processed by a processor K'(not shown in FIG. 1) that can control a gripping means 62, which, in a preferred embodiment, can be an anthropomorphic robot capable of picking up, by means of a tool 65, from the first output transport system 15, containers 20 of the group G, G', G'', G''', ..., analyzed by the second control means and the processor K, and to deposit them in order on the second output transport system 70 in order to realize a second continuous and ordered flow 50 of containers 20 wherein each of the containers 20 is vertically arranged on the main axis X-X and perpendicular to the surface 72 of said second output transport system 70, all equidistant from one another, or rather spaced between each other by a constant pitch $P_1$ along the output direction MD''', and, in the case of containers with an asymmetric shape, with the main surfaces A and B facing towards the respective edge 71, 73 of the second output transport system 70, or rather a continuous and ordered line 50 of vertically arranged containers 20, all with the same position, as clearly represented in FIG. 1.

In the preferred embodiment shown in FIG. 1, the directions MD of the first continuous and ordered output flow 40 of the containers 20 and the direction MD'' of the second continuous and ordered output flow 50 are, typically, parallel to each other. While the directions of the two flows may be the same or different from each other. In the embodiment of FIG. 1 the direction MD of the first continuous and ordered output flow 40 is the same as the direction MD'' of the second continuous and ordered output flow 50.

In a particularly preferred embodiment, as clearly shown in FIG. 1, it is possible to do without the second control means, and it is possible to use a single controller K which also performs the functions of K'.

In this preferred embodiment, the controller K can control all the gripping means 12, 12' and 62, and can therefore know the instantaneous position of each container 20 of the first continuous and ordered output flow 40 that has been generated by the gripping means 12, 12' and therefore is capable of controlling the gripping means 62 for picking up said containers 20.

A particularly suitable gripping means 62 for this type of apparatus is the TX90 model 6-axis anthropomorphic robot for medium loads produced and marketed by Stäubli International AG—PO Box 30—CH—8808 Pfäffikon/Switzerland.

In the particularly preferred embodiment, a processor K suitable for controlling all the gripping systems 12, 12' and 62 present in the apparatus of the preferred embodiment, can be the one mentioned above, i.e. a group of control elements centered on a PLC (Programmable Logic Control) Siemens S400.

The gripper 65 that is provided with the gripping means 62 can be arranged for multiple simultaneous gripping of containers 20. It must be able to pick up the minimum number N of containers 20 in a single operation, which constitutes the population of the smallest group of containers, or rather, where possible, one of its integer submultiples.

The gripper 65 which is provided with the gripping means 62 can also be provided with a piece of apparatus for generating a vacuum of the type VGS3010.AB.01.BA and of a suction cup OB20×60P5E.G31M both produced and marketed by Piab Italy S.r.l—Via Cuniberti, 58—10151 Torino—Italy.

In the particularly preferred embodiment, shown in FIG. 1, the multiple gripper 65 is able to grasp in a single operation, the minimum number N, equal to 3, of containers 20 which constitutes the population of the smallest group of containers, i.e. the gripper is arranged to pick up an entire group of containers 20 composed of the minimum number N=3 of containers, in a single operation, from the first output transport system 15. Or rather, referring to FIG. 3, it is able to pick up the groups G, G' and G''' in a single operation, while it will be able to pick up the group G'', which is composed of a population equal to two (2) times the minimum population N=3, in two (2) successive operations or rather, in a number of operations equal to the integer multiple of the minimum number N of containers that generates the population of said group G''.

In the preferred embodiment, once the gripper 65 has grasped the containers 20 of the group G, G', G'', G''', ... being processed, the gripping means 62 deposits them on the second output transport system 70 orienting the surfaces in the predefined position as described above, thus generating the second continuous and ordered output flow 50 of vertical containers 20.

Said final organizing, in the preferred configuration, is made possible by the fact that the gripper 65, both in the case of single gripping and in the case of multiple gripping, can be installed on the first end 63 of an arm 66 of the gripping means 62 which, in turn, presents a hinge 68 on the second end of the arm 66, capable of rotating said arm 66 about the axis of rotation 67 of the hinge 68. Therefore, the gripper 65, once it has grasped the containers 20—either individually, or the whole group—before depositing them on the second output transport system 70, rotates about the axis of rotation 67 in a clockwise or anticlockwise directing depending on the position presented by the containers on the first output transport system 15, which is the feeding system of the manipulator (or gripping means) 62.

Figure 5:
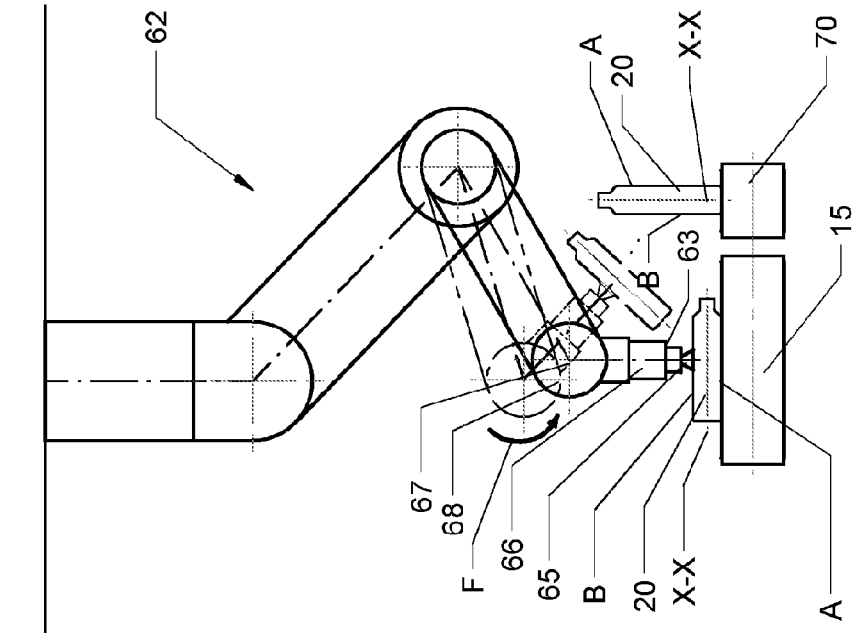
FIGS. 4 and 5 are sections according to the line IV-IV of FIG. 1 in two different stages of work
Figure 4:
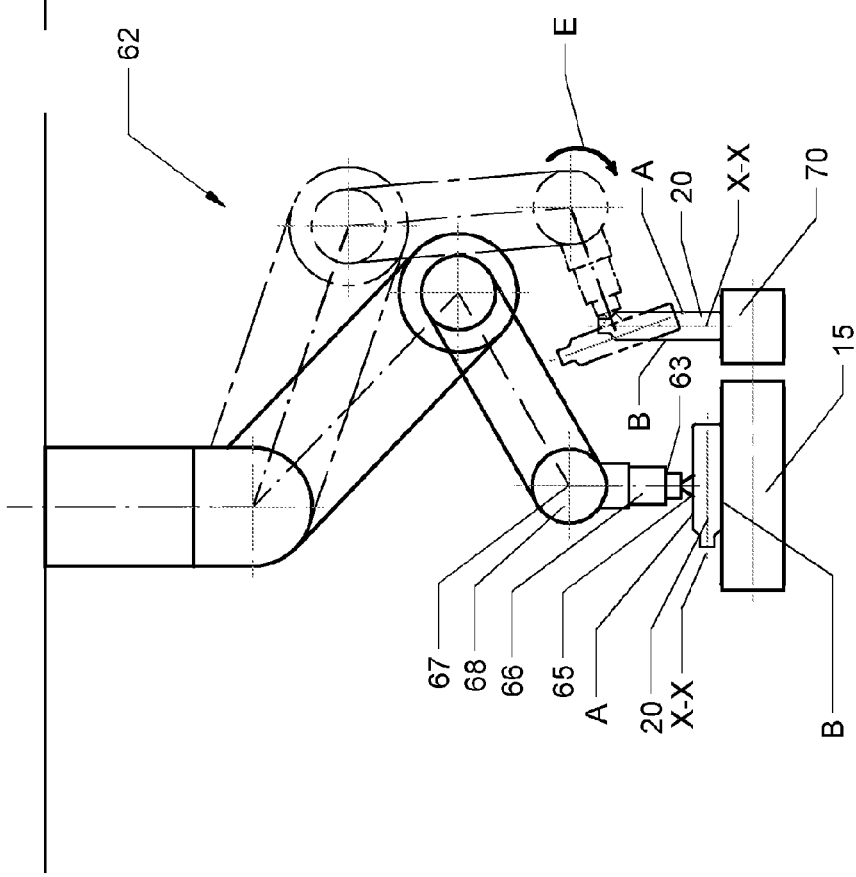

To better clarify the concept just expressed, one can refer to FIGS. 4 and 5, which schematically illustrate some of the salient points of the path traveled by the containers 20. In particular, FIGS. 4 and 5 show the instant wherein the containers 20 are captured by the gripper 65, the instant wherein the containers 20 are to be deposited on the second output transport system 70 and an intermediate instant. FIG. 4 shows the case in which said containers 20 present the position wherein the main surface B is lying on the surface 18 of the first output transport system 15. Therefore, the arm 66 as it approaches the unloading position of the containers 20 it will perform a clockwise rotation about the axis 67, as clearly shown by the arrow E. FIG. 5 shows the case wherein the main surface A is lying on the first output transport system 15, whereby the arm 66, as it approaches the unloading position of the containers 20 will perform a rotation about axis 67 in an anticlockwise direction, as indicated by the arrow F. Obviously, the above-mentioned clockwise and anticlockwise directions of rotation are relative to an observer looking at the aforesaid FIGS. 4 and 5.

In the preferred embodiment, as represented in FIG. 1, the first and the second continuous and ordered output flow 40 and 50 of containers 20 present both the aforesaid containers spaced between each other at an equivalent pitch. Or rather, the pitch P of the first continuous and ordered output flow 40 is equal to the pitch $P_1$ of the second continuous and ordered output flow 50, in virtue of the fact that the gripper 65 of the gripping means 62, responsible for picking up the containers 20 from the first output flow 40 and to release them, generating the second flow 50, is provided with a multiple gripper capable of simultaneously picking up N containers 20. Therefore, the pitches P and $P_1$ are equal to each other and equal to the interaxis in which the individual gripping mechanisms that form the tool 65 are positioned.

In the case wherein the gripper 65 only takes one container 20 at a time, as is well known to the skilled person, it is possible to realize two output flows 40 and 50 with two different pitches P and $P_1$. This is thanks to the fact that in the various stages of the organizing process of the containers it is possible to modulate both the speed of the first transport system 15 from which the containers 20 are picked up, and the speed of the second transport system 70 on which, subsequently, the containers 20 are placed. This is possible thanks to the fact that a gripping means 62 such as an anthropomorphic 6-axis robot is able to pick up the containers 20, both individually and in groups of N, modulating the speed of the individual axes in such a way that the relative speed of the gripper 65 with respect to the linear speed of the first output transport system 15 and to the linear speed of the second output transport system 70 is zero, respectively, during the steps of picking up and releasing.

Further salient aspects of the present invention are related to the architecture of the feed transport system 11, 11' and the output transport conveyor belt 15. In the preferred embodiment, as shown in FIG. 1, the random feed of the containers from bags or baskets is carried out on two feed transport systems 11 and 11', placed at the sides of the output transport system 15. This configuration provides important advantages with respect to the classical configuration that only envisages a single feed transport system of greater dimensions, typically placed at the side of the output transport system 15.

For this reason it should be noted that the dimensioning of the feed transport system, that can typically be a conveyor belt, or rather, the choice of its width and its linear speed, is made according to the size and number of containers that it has to carry in the unit of time. Experience has shown that the optimal speed for the feed belts that constitute the feed transport system of a piece of apparatus realized according to any of the preferred embodiments is comprised in a range from 0.5 to 1.16 m/s (30-70 m/min).

It has also been observed, moreover, that in order to obtain a continuous and homogeneous ordered flow of containers 20, or rather a flow of containers wherein gaps caused by the absence of one or more components in the first ordered output flow 40 are almost completely eliminated, as well as, consequently, in the second ordered output flow, it is necessary to have a feed flow 30, 30' of randomly supplied containers at the input of the organizing machine that is roughly three times more than that required by the downstream apparatus, i.e. by the apparatus capable of carrying out the labeling, filling and closing operations of said containers 20. Therefore, if an ordered feed flow of 400 containers/1' to the labeling, filling and closing apparatus is desired, it is necessary to provide a random feed of about 1,200 containers/1' to the conveyor belts of the transport system. Combining these aforesaid data and taking into account the average size of the present containers on the market designed to contain, for example, shampoo, liquid soap, detergent or other cleaning and hygiene products, it has been determined that for organizing machines able to organize 400 containers per minute, in the case of only one feed transport system, it may typically be equipped with a belt having a width of about 1,000 mm (1 meter). Alternatively, if two feed transport systems are opted for, these can each be equipped with a belt 11, 11' that is 500 mm wide.

The fact of separating the feed flow 30, 30' into two and of placing the output transport system 15 between the two feed belts 11 and 11' allows the gripping means 12, 12', also placed between the two feed belts, to make the shortest paths. Indeed, if the organizing machine 10 of the preferred embodiment is examined, it can be observed that the at least one gripping means 12, 12', placed between the two feed belts 11, 11', follows paths which are approximately half of the magnitude of the paths that they would have to follow in the case that the feed occurred with a single belt. The above is independent of the location of the gripping means 12, 12'. Or rather it is separate from the fact that the gripping means 12, 12' is placed exactly between the two feed belts 11, 11', i.e. typically above the output transport system 15, or in the specific case, wherein more gripping means 12, 12' are present, each of said gripping means is arranged laterally to said output transport system 15, in particular in the vicinity of the respective feed conveyor belt 11, 11', so that each feed transport system 11, 11' is provided with at least one of its own gripping means 12, 12'. In other words considering that each container 20 must be deposited at the centerline of the output conveyor belt 15, it is obvious that, in the worst case wherein the initial position of the container 20 is in the vicinity of the edge of the feed belt 11, 11' furthest away from the output transport system 15, the distance that said container 20 must travel in a transverse direction to reach the final position coinciding with the centerline of the output transport system 15 is equal to the sum of the width of the feed belt of the transport system 11, 11' from which it has been picked up plus half of the width of the output transport system 15 where it is laid, and it is obvious that in the case wherein the feed is carried out with only one belt, said distance is almost double with respect to the case wherein the feed is carried out with two belts of a width equal to half the width of a single belt.

Therefore, without prejudice to the principle of the invention, as we have said many times, it is particularly suitable for organizing containers of an asymmetrical shape, but can, however, be applied to containers of any shape; in addition the details of construction and the embodiments may vary widely with respect to those described and illustrated without departing from the scope of the invention as defined by the claims that follow.

The invention claimed is:

1. Method for realizing a continuous and ordered flow of containers, wherein said containers have respective filling openings, a main axis, a bottom surface, a first main face and a second main face that connect said opening to said bottom surface said method comprising the steps of:
   providing a feed flow of containers in a direction, with a transport system, said containers being arranged with the respective main axis randomly orientated and with one of said two main faces lying on a transport surface of said transport system,
   detecting for each container a position and orientation of the main axis, and which of the two main faces lies on the transport surface of said transport system,
   picking up said containers from said transport surface of said transport system, and releasing said containers in a first continuous and ordered flow in an advancing direction, on a surface of a first output transport system, wherein said containers are aligned, equidistant from one another with the respective main axes parallel to each other and perpendicular to said advancing direction, where the containers that have the first main face lying on said surface of said first output transport system output are arranged with the respective filling openings facing in a first direction, while the containers that have the second main face lying on said surface of said first output transport system are arranged with the respective filling openings facing in a second direction opposite to the first direction,
   transporting said containers of said first continuous and ordered output flow along said advancing direction,
   picking up said containers from said first continuous and ordered output flow,
   rotating the main axis of each container by 90° in a first direction in a plane perpendicular to the advancing direction of the first continuous and ordered output flow, the containers that have the first main face lying on the surface of the first output transport system of said first output flow, and rotating in a second direction, opposite to the first direction, the containers that have the second main face lying on the surface of the first output transport system of said first output flow,
   depositing said containers on a second output transport system, realizing a second continuous and ordered output flow in an advancing direction wherein said containers are aligned, equidistant from one another and with the respective main longitudinal axes perpendicular to the surface of said second output transport system, with filling openings facing upwards and with the respective main faces all oriented in the same direction, and
   transporting said containers along said advancing direction of said second continuous and ordered output flow.

2. Method for realizing a continuous and ordered output flow of containers according to claim 1, wherein the method organizes said containers in said first output flow into groups of consecutive containers, each of said groups of containers being composed of containers that present the same main face lying on the surface of said first output transport system of said first output flow and the respective filling openings all facing in the same direction.

3. Method for realizing a continuous and ordered flow of containers according to claim 2, wherein consecutive groups of said containers present the filling openings facing in opposite directions.

4. Method for realizing a continuous and ordered flow of containers according to claim 2, wherein each group of containers includes a number N of containers or one of integer multiples wherein N is between 2 and 50, and wherein each of said groups of containers have the filling openings facing in the same direction.

5. Method for realizing a continuous and ordered flow of containers according to claim 4, wherein N is between 3 to 10.

6. Method for realizing a continuous and ordered flow of containers according to claim 2, wherein each group of consecutive containers is composed of the same number N of containers.

7. Method for realizing a continuous and ordered flow of containers according to claim 6, wherein the method comprises simultaneously picking up a multiple of N of said containers from said first continuous and ordered output flow.

8. Method for realizing a continuous and ordered flow of containers according to claim 1, wherein said advancing direction of said second continuous and ordered output flow is parallel to the advancing direction of said first continuous and ordered output flow of said containers.

9. Device suitable for realizing a continuous and ordered flow of containers, wherein said containers present respective filling openings and a main axis, a bottom surface, a first main face and a second main face connecting said opening to said bottom surface, said device comprising:
   a feed transport system, configured for advancing a respective flow of containers along a feed direction, said containers being arranged with the respective main axes randomly oriented and with one of said main faces lying on a surface of said feed transport system,
   at least one control means capable of detecting a position and orientation of the main axis of each container and which of the two main faces is lying on the surface of said feed transport system,
   a first output transport system, arranged for advancing a first continuous and ordered output flow of said containers along an advancing direction, and
   at least one gripping means positioned in close proximity to said feed transport system of said feed flow and said first output transport system configured to pick up said containers from said feed flow and to deposit them on a surface of said first output transport system in a first continuous and ordered output flow wherein said containers are aligned, equidistant between them, with the respective main axes parallel to each other and perpendicular to said advancing direction, where the containers that have a first main face lying on said surface of said first output transport system of said first continuous and ordered output flow are arranged with the respective filling openings facing in a first direction, while the containers that have the second main face lying on said surface of said first output transport system of said first continuous and ordered output flow are arranged with the respective filling openings facing in a second direction opposite to the first direction,
   a second output transport system placed in the vicinity of said first output transport system, suitable for advancing a second continuous and ordered output flow of said containers along an advancing direction, and at least one gripping means located in the proximity of said first output transport system and said second output transport system configured to pick up said containers from said first output transport system and to release them on said second output transport system after having made a 90° rotation of the main axis of each container in a first direction in a perpendicular plane to the advancing direction of the first continuous and ordered output flow, for the containers that have the first main face lying on the surface of said first output transport system, and in a second direction opposite to the first direction for the containers that have the second face lying on the surface of said first output transport system, so as to generate a second continuous and ordered output flow wherein said containers are aligned and equidistant, such that the respective main axes are perpendicular to a surface of said second output transport system, with the filling openings facing upwards and with the respective main faces all oriented in the same direction.

10. Device configured for realizing a continuous and ordered flow of containers according to claim 9, wherein at least one of said gripping means is an anthropomorphic robot.

11. Device configured for realizing a continuous and ordered flow of containers according to claim 9, wherein said gripping means is provided with a gripper capable of simultaneously picking up a multiple of N of said containers from said first continuous and ordered output flow.

12. Machine capable of carrying out at least one of the operations of labeling, filling and closing containers wherein it includes a device configured for realizing a continuous and ordered flow of containers according to claim 9.

13. Method for realizing a continuous and ordered flow of containers according to claim 9, wherein the advancing direction of the first continuous and ordered output flow of said containers is parallel to the direction of said feed flow.

14. Method for realizing a continuous and ordered flow of containers according to claim 9, wherein the advancing direction of the second continuous and ordered output flow of said containers is parallel to the advancing direction of said first continuous and ordered output flow.

* * * * *